United States Patent [19]
Stowe et al.

[11] Patent Number: 5,452,393
[45] Date of Patent: Sep. 19, 1995

[54] MINIATURE FIBEROPTIC BEND DEVICE AND METHOD

[75] Inventors: David W. Stowe, Milford, Mass.; Paul W. Fitzgerald, Allentown, Pa.; Frederick J. Gillham, Westboro, Mass.

[73] Assignee: Aster Corporation, Hopkinton, Mass.

[21] Appl. No.: 971,816

[22] PCT Filed: Jun. 17, 1991

[86] PCT No.: PCT/US91/04322
§ 371 Date: Feb. 12, 1993
§ 102(e) Date: Feb. 12, 1993

Related U.S. Application Data

[63] Continuation-in-part of Ser. No. 539,010, Jun. 15, 1990, Pat. No. 5,138,676.

[51] Int. Cl.⁶ .............................................. G02B 6/16
[52] U.S. Cl. ..................................... 385/123; 385/39; 385/136
[58] Field of Search ....................... 385/27, 28, 30, 32, 385/39, 42, 43, 50, 123, 134–136, 139, 147

[56] References Cited

U.S. PATENT DOCUMENTS

| | | | |
|---|---|---|---|
| 3,912,478 | 10/1975 | Presby | 385/28 X |
| 4,083,625 | 4/1978 | Hudson | 385/43 |
| 4,136,929 | 1/1979 | Suzaki | 385/30 |
| 4,253,727 | 3/1981 | Jeunhomme et al. | 385/37 |
| 4,256,365 | 3/1981 | Lemesle et al. | 385/43 |
| 4,291,940 | 9/1981 | Kawasaki et al. | 385/43 |
| 4,315,666 | 2/1982 | Hicks, Jr. | 385/30 |
| 4,342,499 | 8/1982 | Hicks, Jr. | 385/30 |
| 4,386,822 | 6/1983 | Bergh | 385/11 |
| 4,482,203 | 11/1984 | Stowe et al. | 385/30 |
| 4,493,528 | 1/1985 | Shaw et al. | 385/30 |
| 4,595,251 | 6/1986 | Moulin | 439/289 |
| 4,812,001 | 3/1989 | Tomita et al. | 385/123 |
| 4,906,068 | 3/1990 | Olson et al. | 385/43 |
| 4,911,510 | 3/1990 | Jenkins | 385/136 |
| 5,011,251 | 4/1991 | Miller et al. | 385/43 |
| 5,138,676 | 8/1992 | Stowe et al. | 385/32 |

FOREIGN PATENT DOCUMENTS

| | | |
|---|---|---|
| 0301840 | 2/1989 | European Pat. Off. |
| 2426920 | 12/1979 | France |
| 3034873A1 | 3/1982 | Germany |
| 3326406A1 | 2/1985 | Germany |
| 53-91752 | 8/1978 | Japan |
| 2126749 | 3/1984 | United Kingdom |
| WO90/00261 | 1/1990 | WIPO |

OTHER PUBLICATIONS

F. Szarka et al., "A Review of Biconical Taper Couplers", *Fiber and Integrated Optics*, vol. Nos. 2–3, May 21, 1980.

(List continued on next page.)

*Primary Examiner*—John D. Lee
*Attorney, Agent, or Firm*—Hoffmann & Baron

[57] ABSTRACT

A routing device for changing the direction of a fiberoptic path from a first axis to a second axis comprising a length of optical fiber having first and second directed fiber portions aligned with the first and second axes, respectively, and having a mid-potion extending through an arc of radius of the order of 2 cm or less; the mid-portion of the fiber having been treated to have a substantially reduced diameter relative to the directed fiber portions. In certain preferred embodiments, the diameter of the mid-portion of the fiber is sufficiently reduced to achieve an air-cladded state. Preferably the routing device includes an outer member for fixing the first and second directed portions relative to one another. The mid-fiber portion is preferably reduced by etching, polishing, or drawing (e.g., differential speed unidirectional drawing). Bent sections of the fiber are thermally annealed forming stress-free bends of minimum bend radius for long term applications. The fiber may also be twisted about its longitudinal axis. Bend or twist tolerant regions and annealed bends are preferably packaged separately or built integrally into a wide range of fiberoptic components, sensors, networks, or systems, with significant space savings, added performance features and mechanical flexibility.

28 Claims, 8 Drawing Sheets

OTHER PUBLICATIONS

Campbell, "Jaws–A Coupler for Computer Rings", *SPIE*, vol. 479, 1984, p. 86.

Olshansky, "Propagation in Glass Optical Waveguides", *Review of Modern Physics*, vol. 51, No. 2, Apr. 1979, pp. 341–367.

Gillham, et al., "Designer's Handbook: Fiber Optic Couplers for Multiplexing", *Photonics Spectra.*, Apr. 1984.

S. K. Sheem et al., "Single–mode fiberoptical power divider: encapsulated etching technique", *Optic Letters*, vol. 4, No. 1, Jan. 1979, p. 29.

Snyder et al., "Bends" Optical Waveguide Theory, Chapter 23, Chapman and Hall Ltd., pp. 474–486 (1983).

Sharma, et al., "Constant–Curvature Loss in Monomode Fibers: An Experimental Investigation," *Applied Optics*, vol. 23, No. 19, pp. 3297–3301 (No Date Given).

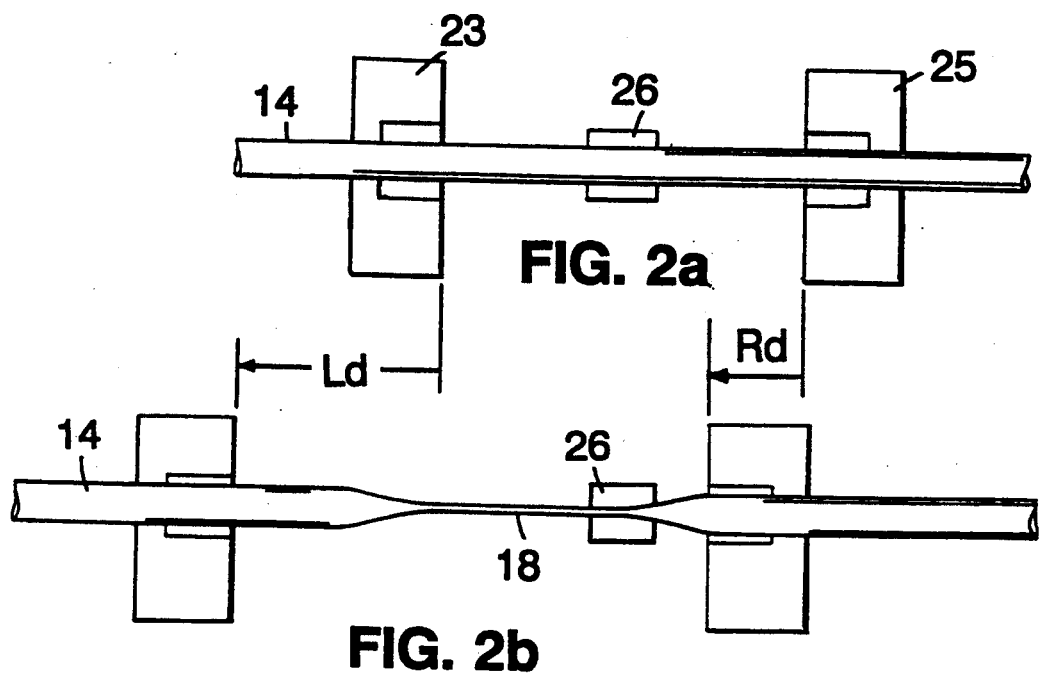

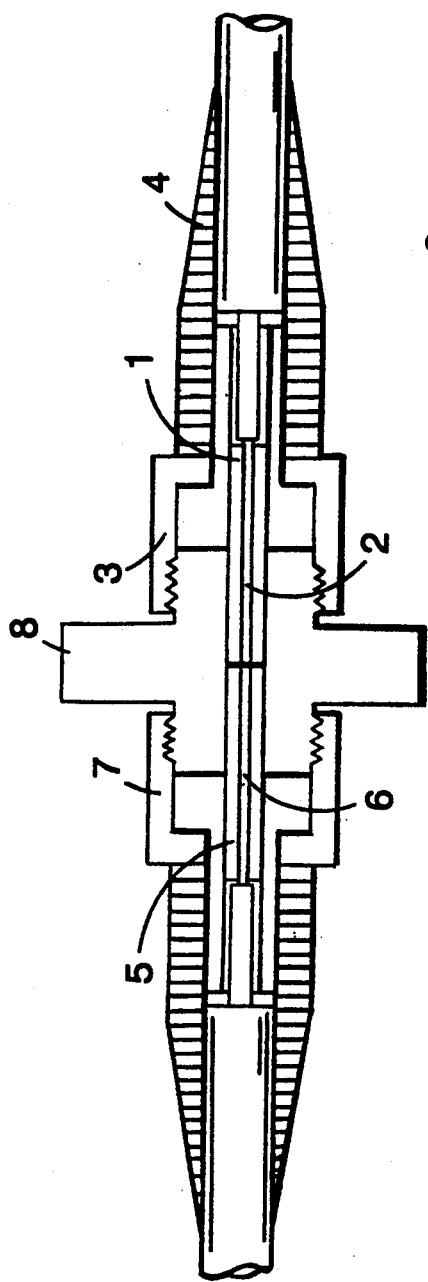
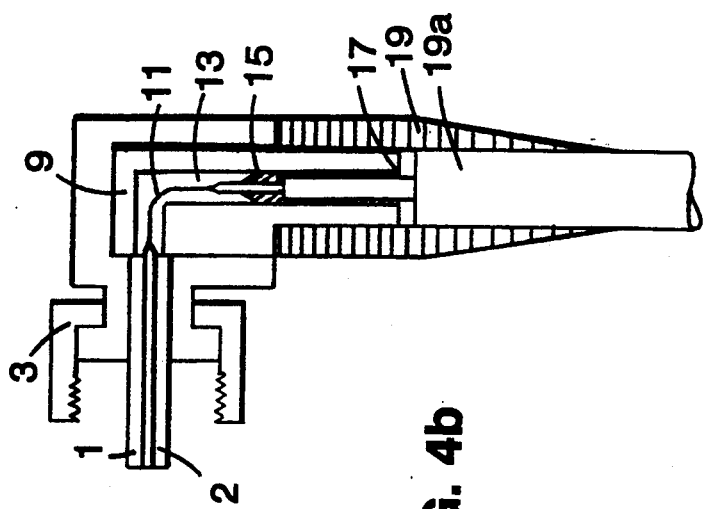
FIG. 4a
FIG. 4b

MINIATURE FIBEROPTIC BEND DEVICE AND METHOD

This is a continuation-in-part of U.S. Ser. No. 07/539,010, filed Jun. 15, 1990, issued Aug. 11, 1992 as U.S. Pat. No. 5,138,676.

FIELD OF THE INVENTION

The invention relates to a family of new fiber routing components. The invention also relates to providing bends in optical fibers with no appreciable loss of optical power and without fracturing the fiber or affecting its longevity. The invention also relates to packaging electro-optical and fiberoptic components in greatly reduced package volumes. The invention further relates to twisting optical fibers without incurring breakage or loss of optical power.

BACKGROUND OF THE INVENTION

Panel connections of glass fiberoptic cables are often cumbersome and inefficient. An example is a patch panel for a communications network in which a great number of side-by-side fiber cables are connected endwise to the face of the panel. The cables extend outwardly in a group and bend only gradually from the connection to avoid mechanical failure of the glass fibers and signal loss. Routing of fiber cables in restricted spaces, as in an automobiles, presents similar problems.

Fiberoptic device packages are often large and cumbersome due to large radius bends required in glass fibers within the packages.

SUMMARY OF THE INVENTION

According to one aspect of the invention we have realized that small routing devices that reorient the fiber path from one axis to another over a short distance are both practical to realize and can contribute significantly to routing of optical fibers.

In achieving many such configurations the bent fiber portion is provided in a special treated state that reduces likelihood of mechanical failure over time. Depending upon the application and the particular treatment employed, bend loss of say 10 percent may be tolerated or bend loss can be reduced to a minimal amount. Treatment includes reduction in diameter and/or annealing heat treatment, and/or provision, effectively, of air cladding in the region of the bend.

According to one aspect of the invention a routing device is provided for changing the direction of a fiberoptic path from a first axis to a second axis. The routing device comprises a short length of low-loss optical fiber having first and second directed portions aligned respectively with the first and second axes and a mid-fiber portion integral with and extending through an arc of radius of the order of two centimeters or less between the first and second directed fiber portions. The mid-portion of fiber is in a treated state that reduces likelihood of mechanical failure over time without introducing substantial optical loss, e.g., the diameter is reduced relative to the main portion of the fiber, or the fiber is bent and annealed to reduce bending stresses. This treated section of fiber is typically housed in an outer member that fixes the first and second directed fiber portions relative to one another in a predetermined, desired angular relationship. The outer member also serves to protect the first and second directed portions and the mid-portion from the environment.

According to a more particular aspect of the invention, a selected length of optical fiber, in a region where the exterior of the fiber is exposed to an external environment having an index of refraction substantially lower than that of the solid clad layer, is reduced in diameter in a manner to cause the fiber to conduct light by internal reflection attributable at least in part to the difference in index of refraction at the interface between the exterior of the fiber and the external environment. By this means light energy can be transmitted through the region with substantially lower bend-loss than a similarly bent section of the main length of the fiber, and it is in this region that the fiber is oriented differently, e.g. bent and/or twisted relative to an adjacent portion of the fiber, without causing substantial light loss attributable to the orientation. In both single mode and multimode fibers, the optical mechanism which allows a very significant reduction in bend radius relates to the change of waveguide structure accompanying diameter reduction. Optical fibers typically have a core with index of refraction $N_1$ somewhat greater than the index of the surrounding cladding material $N_2$. It is customary to characterize the relationship between core and cladding indices by a percentage difference $\Delta$ (delta) defined by equation 1 below. The term, delta, is sometimes called the profile parameter.

$$\Delta = (N_1^2 - N_2^2)/2N_1^2 \qquad (1)$$

Delta usually ranges from 0.001 to 0.030 with most fiber materials. This means that $N_1$ and $N_2$ are very nearly the same and often in the range of 1.5. Such fibers are referred to as weakly guiding fibers because of the low value of index difference. The greater the value of delta, the less susceptible a fiber to bending losses.

When the diameter of the fiber is reduced, for example by heating and redrawing the heated region, the cladding and core diameters are both reduced. It is found that eventually the outer diameter of the reduced fiber becomes so small that the original cladding material is no longer effective as a cladding. The fiber becomes essentially clad by the surrounding medium. In the event that the surrounding medium is air, the value of $N_2$ decreases to 1.0. For typical cores having $N_1$ in the range of 1.5, this results in an increase in delta of about 100 fold. Because of this dramatic increase in delta, the reduced diameter fiber is able to guide light around much smaller bends than the original fiber without loss of light.

Because this aspect of the invention enables the achievement of miniature bends relative to those heretofore achieved, this aspect of the invention is sometimes referred to as the "miniature bend invention", but the concepts and contributions go far beyond that important achievement.

In another aspect of the invention conventional fibers are bent into a predetermined shape and permanently annealed in that shape to achieve a routing device. A fiberoptic path is formed within a selected region of unaltered optical fiber wherein the selected region is bent to a predetermined radius of curvature and subsequently heated to a suitable annealing temperature. The heating is controlled in a manner to relax mechanical bending stress in the selected region without increasing the optical power loss attendant to the predetermined bend. The bend may extend through an angular range substantially greater than zero angular degrees and may exceed multiples of 360 angular degrees, e.g., the fiber may be coiled. The bend has optical power loss substantially governed by the optical properties of the unaltered fiber and radius of curvature. The radius of curvature may be of the order of or exceed 1000 times the core radius of the unaltered fiber. After thermal annealing the bend angle and radius of curvature are substantially fixed. This embodiment is not an air clad miniature bend but finds application in conventional connectors and other locations where fiber routing is troublesome. After annealing the bare, annealed section of fiber is preferably recoated with a suitable polymer for protective purposes. In this form the bent fiber is large enough to be easily handled during assembly processes.

In various embodiments the bend angle is about 90° or about 180°.

For miniature embodiments, the radius of curvature of the bend is less than 1000 times the radius of the core of the unaltered main length of the fiber. The selected region is bent tightly around a small diameter support and in certain embodiments the selected region is wrapped a multiplicity of turns around the small diameter support.

Preferred embodiments in which the fiber is bent comprise important specific devices. One of these is an optic connector device. Preferably in such a device the fiber optic path extends from a fiber butt end forming a connection interface having a first axis of orientation through the bend to a fiber portion having an axis lying at a substantial angle to the first axis.

Another important use of the miniature bend aspect of the invention is to realize an improved joint assembly in which regions of the fiber adjacent the selected region are secured in respective members of a joint which are movable with respect to each other to a limited extent with corresponding bending of the selected region.

Another important use of the invention is to realize improved optic couplers. In one case where the optic coupler device is formed of a plurality of optic fibers, an extension of one of the fibers forms a fiber optic path having a sharp bend, e.g. 90° and in important instances 180° realized according to the invention. In another case an electro-optic device incorporates the fiber optic coupler incorporating a miniature bend. A package comprising first and second optical components mounted on a rigid support and connected by the fiber optic path having a miniature bend, in some cases the first optical component being an optic coupler and the second component selected from the group consisting of light emitters and light detectors; in other cases the package comprises a transceiver comprising a coupler, a light emitter and a light detector.

According to another aspect of the invention, a method is provided for reducing the allowable bending radius of an optical fiber, comprising reducing the cross-sectional area of a region of the fiber sufficiently to reduce the optical power loss and mechanical stresses associated with bending in the region of reduced cross-sectional area, in important instances this reduction being sufficient to achieve an "air cladded" state as described above.

There are a number of methods by which a fiber can be processed to reduce the diameter in a short region for use according to the invention. We describe redrawing the fiber in connection with the preferred embodiments. This simple procedure requires that the unjacketed optical fiber be heated along a length of a few millimeters until the fiber material reaches a suitable working temperature. The fiber is then drawn so as to elongate the heated region resulting in a gradual taper between the original fiber and the region of reduced cross-sectional area. When done properly the reduced region has nominally uniform cross-section throughout the effective length of reduction.

Alternatively, fibers may be etched using, e.g., a solution of hydrofluoric acid. Etching, as discussed herein includes all forms of molecular processing. Therefore, plasma etching, ion milling, solvent processing, and any other means relying on the chemical properties of the fiber are considered to be means of etching. Fibers may also be reshaped by mechanical means such as by grinding or polishing. In practice a combination of means often is best to achieve a particular desired final diameter or an intermediate diameter or shape suitable for secondary processing to the final reduced cross-sectional shape.

Fibers of greatly reduced diameter and relatively short length, e.g., 2 cm, can be twisted through many complete rotations before breaking. This provides the means to achieve a miniature rotational joint component featuring a continuous length of fiber between units interconnected. Such a joint of the invention incorporates a single fiber fixed at both ends of a mechanical means comprising two axially aligned pieces which are free to rotate relative to one another about the axis. The fiber section between the fixed points, i.e., that section of fiber subject to twisting when the mechanical means are rotated, is of greatly reduced diameter. Fibers exiting from the rotational section are of original diameter and can be spliced into other fiber optics with very low loss. The entire assembly can be made very small, of the order of a few centimeters in length and about a centimeter in diameter, and produces no modulation of optical power in the fiber when rotated. There is, of course, a finite limit to the number of full twists allowed, but for many industrial machine operations, oscillatory rotations of plus or minus 45 angular degrees to plus or minus 360 angular degrees are common. The invention easily meets such requirements for a rotary joint. Similarly, hinge joints, linear translation joints, universal joints, and vibration isolators can be fashioned using the fiber optic methods of the invention.

Reference is made to the following description of preferred embodiments and the claims for further description of novel features of the invention.

BRIEF DESCRIPTION OF THE FIGURES

FIG. 1a is a side view of a fiber with jacket removed. FIG. 1b is a side view of a fiber after diameter reduction. FIG. 1c is a side view of a bent reduced fiber. FIGS. 1d and 1e are cross-sectional views of the fiber of FIG. 1c in the original and reduced regions taken along lines 1d–1d and 1e–1e, respectively.

FIG. 2 is a top view schematically illustrating a differential speed uni-directional drawing method: a) before drawing, and b) after drawing.

FIG. 4a is a sectional side view illustrating the main elements of a conventional connector.

FIG. 4b is a sectional side view illustrating the main elements of a right-angle connector featuring a miniature bend.

DESCRIPTION OF PREFERRED EMBODIMENTS

Figure 1A:
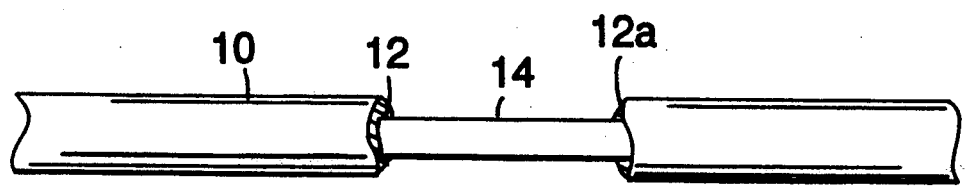
FIGS. 1a–1e show an optical fiber in successive steps of cross-sectional area reduction.
Figure 1B:
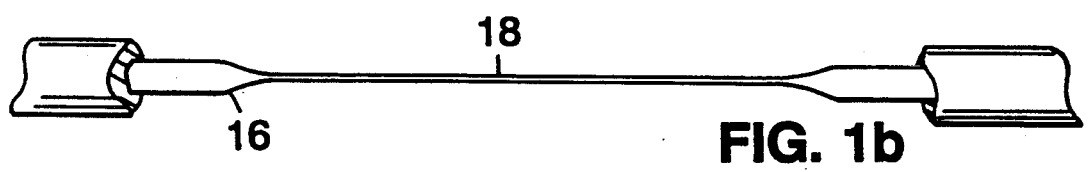
Figure 1C:
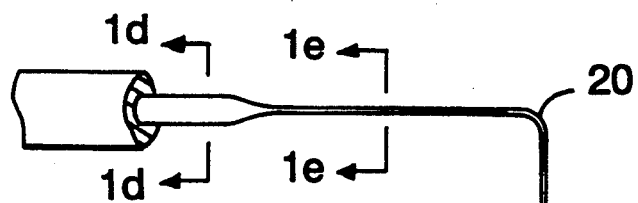
Figure 1D:
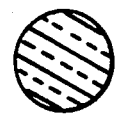
Figure 1E:
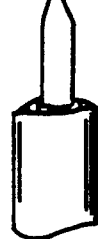

FIG. 1 illustrates the fundamental concept of the miniature bend aspect of the invention. An optical fiber 14 is usually enclosed in a jacketing material 10. The optical fiber 14 is exposed by cutting away a portion of the jacket as between 12 and 12a in FIG. 1a. By means to be discussed herein, the optical fiber 14 is processed so that a selected region of reduced cross-sectional area 18 results. The term cross-section here applies to sections 1d–1d and 1e–1e of FIG. 1c viewed into the axial direction of the fiber. The section 1d–1d represents the original fiber and 1c–1c the reduced fiber as further illustrated in FIGS. 1d and 1e. In the region of reduced cross-sectional area 18, a bend 20 as illustrated in FIG. 1c can be much smaller than a bend in the original fiber.

The methods of reducing the cross-sectional area of a fiber include etching, machining, and drawing. Combinations of these techniques can also be used. While the nature of the invention is independent of the process used to achieve the reduction, a preferred approach is discussed here.

Drawing a fiber to reduce the cross-sectional area typically has involved heating a region of the fiber to a suitable working temperature and pulling on one or both ends of the fiber so as to elongate the heated region. Experience has shown that single mode fibers can be drawn from an original overall diameter of 130 microns to diameter of less than 0.1 micron with less than 1 percent excess loss of optical power throughout by such well known drawing means. Of particular importance to the invention is a method we refer to as "differential speed uni-directional drawing".

Differential speed uni-directional drawing describes the novel and extremely useful technique of moving both ends of the heated optical fiber in the same direction at different speeds thus creating a drawing tension in the fiber and hence elongation of the heated region. This is illustrated schematically in FIG. 4. The resulting reduced cross-sectional area remains constant over any desired length of processed fiber. Phenomenologically, the region of constant cross-sectional area 18 results because a steady state is reached wherein fiber material is fed into and extracted from the heated region 26 in FIG. 4 at the same rate. The cross-sectional area required for steady state material flow depends on the difference in speed between the left and right stage, 23 and 25 respectively, when both stages move in the same direction. Therefore, by calibrating the speeds of the stages, long sections of fiber with the same cross-sectional area and shape are produced, and the reduced area can be preselected by choosing a prescribed speed difference.

According to the invention, uni-directional differential speed drawing uses a very small localized heat source such as a microtorch or focused laser beam, operates at relatively small speed differences, and is used to reshape a relatively short length of existing fiber for the advantageous purposes of the invention.

A fiber with cross-sectional area of less than a few square microns requires some form of protective packaging. It is not the purpose of this disclosure to develop all such protective designs, but rather to indicate the scope of some presently embodied as well as foreseen applications of the invention.

Figure 3:
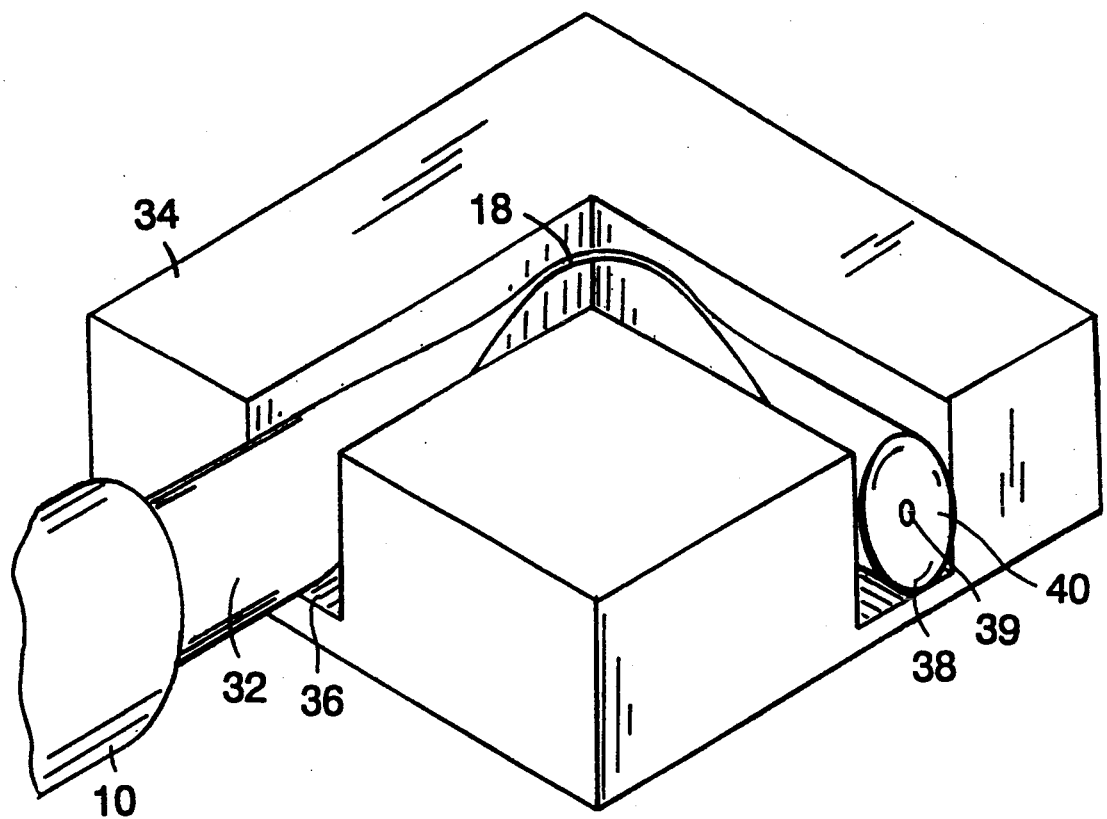
FIG. 3 is a three-dimensional view of a mounting means that fixes the angle of the miniaturized bend.

Bends can be embodied in manners to fix one or more of the radii of curvature, the length of curvature, and the bend angle. For example, FIG. 3 illustrates a jacketed optical fiber 32 mounted in a right-angle grooved supporting structure 34. The jacket 10 is shown removed from the section of fiber entering the supporting structure as might result from the processing steps outlined in the discussion of FIGS. 1a–1e. Here the reduced fiber 18 is bent around 90 angular degrees. It can be seen that the radius of curvature possible in this structure is very small. Typically the fiber can be reduced sufficiently that the mean or minimum radius of curvature is less than the diameter (or smallest overall cross-sectional dimension) of the original fiber. The entire structure of FIG. 3, according to the first aspect of the invention, therefore measures less than 3 millimeters on each side. Without the advantages of the invention the structure would have to measure over 2 centimeters on each side to avoid both excessive optical power loss and the risk of unpredictable breakage.

The bend embodiment depicted generally in FIG. 3 can be used as a miniature right angle routing component. If one thinks of the fiber as entering the structure at the point labeled 36 and exiting the structure at 38, the endface 40 of the exiting fiber might be polished to promote coupling to a photo diode, light emitting diode (LED), laser diode (LD), or for butt coupling to another optical fiber. Any of these devices can be fixed with appropriate bonding methods directly to the endface of the fiber to align with the core 39. In embodiments of those types, the structure shown becomes a right angle pigtail device. Unlike any bending method previously known, this structure is small enough to fit within conventional photodiode, LED, and LD packages. In principle the photodiode can even be deposited directly on the polished end of the integral fiber/support structure.

Alternatively the fiber could be polished at both end 36 and 38. Such an embodiment can be used as a surface mounted optical bend for routing optical power between elements in miniature electro-optic or integrated optic assemblies. Angles other than 90 degrees and supporting structures more robust than that illustrated conceptually in FIG. 3 are envisioned within the scope of the invention.

Similarly, the concept of FIG. 3 can be extended to include convenient means of routing fibers around bends external to equipment packages. The fiber leaving at point 38 may continue beyond the edge of the bend supporting structure. In such embodiment the structure is a miniature right angle bend useful in packaging fiber runs inside or external to fiber optic equipment.

FIGS. 4a and 4b illustrate the advantages of using a miniature bend of the invention in a connector assembly. In FIG. 4a is shown a typical mated pair of fiber optic connectors. Fibers 2 and 6 are held in alignment using ferrules 1 and 5 which closely interfit with the alignment piece 8 which may be bulkhead mounted. Of interest to the invention, the fibers exit the mechanical connector assembly in substantially straight lines through a supporting member 4.

In FIG. 4b a right-angle connector is shown wherein the mechanical supporting means is comprised of an inner guide 9, and outer housing 9a, and a flexible stress relief 19. The miniature bend 11 is formed by means discussed and assembled into the connector with one fiber end fixed by the alignment ferrule 1 and the other end fixed, e.g. by epoxy 15 at the attachment end 17 of the inner housing 9.

The main section of the optical fiber typically exits from such a connector or connector adaptor assembly in a fiber optic cable 19a. The cable may contain strength members and protective layers not shown in FIG. 4b. It is understood by those skilled in the art that such mechanical cabling requires some form of mechanical termination at the connector output 17. A simple form of termination, i.e., adhesive 15 fixing is illustrated. Adhesive may also be applied along the internal surfaces of the flexible stress relief 19 thus attaching the cable outer covering 19a to the stress relief 19.

Figure 4C:
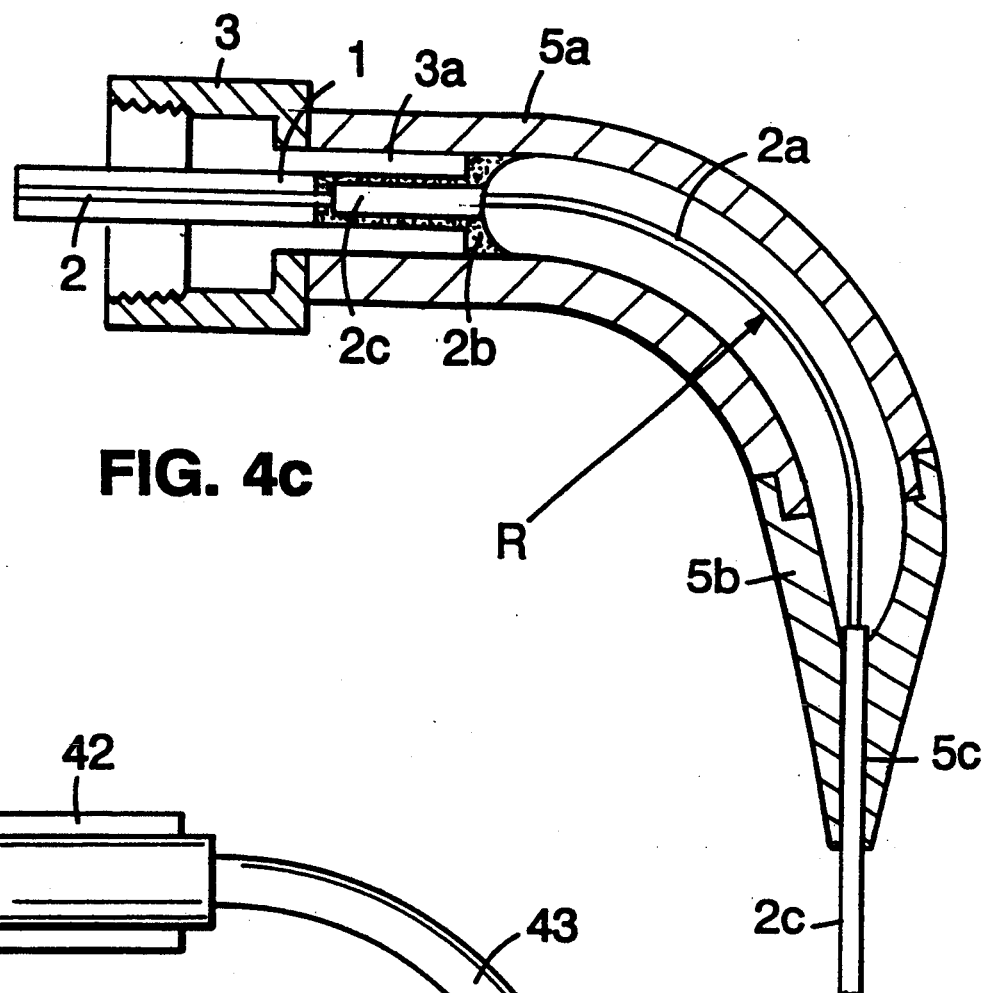
FIG. 4c is a sectional side view illustrating the main elements of a right-angle connector featuring an annealed bend.

FIG. 4c illustrates an alternative right-angle connector featuring the second aspect of the invention, the annealed bend. The bent region of optical fiber 2a in FIG. 4c has radius of curvature, denoted by the arrow labelled R, typically in the one to two centimeter range depending on the properties of the optical fiber employed. This is not a miniature bend. The bent region is formed by an annealing process to be discussed herein. The connector end of the fiber 2 is mounted in a ferrule 1 as in a conventional connector. A portion 2c of the fiber is fixed in the connector body 3a using, e.g., adhesive 2b. A rigid bent tube 5a acts to protect the bent region of fiber 2a and to locate emerging fiber 2c at some angle, e.g., 90 degrees, relative to the connected fiber 2 axis. The bent tube 5a may be metal or injection molded polymer. The fiber emerges from the tube through a mechanical stress relief 5b which is typically attached to the emerging fiber at the exit orifice 5c using adhesive means.

Alternatively, if a cabled fiber is used in this embodiment, the bent tube and stress relief shall possess cable termination features as discussed in FIG. 4b.

Figure 5:
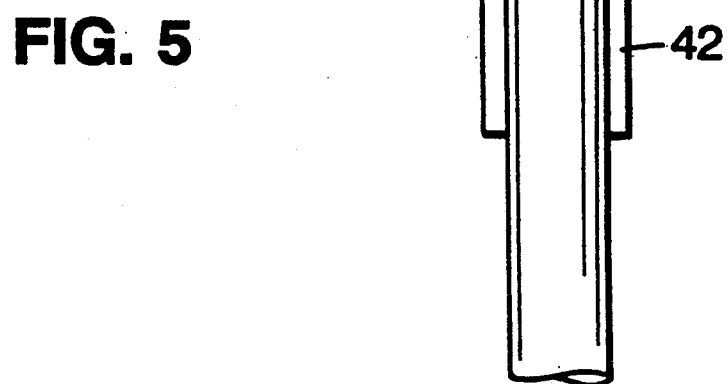
FIG. 5 is a schematic illustration of the major elements comprising a means to fabricate annealed bends in optical fibers.

FIG. 5 schematically illustrates a means of manufacturing an annealed bent fiber. The jacketing material is removed and the fiber is cleaned prior to annealing by methods familiar to those skilled in the art. The fiber 10 is then held in a fixture not shown using clamps 42 so as to form a bent region 43. Heat is applied to the bent region for a short period of time, the temperature and duration of heating depending upon the type of optical material comprising the fiber. When the heat is removed, the optical material freezes into the shape formed by the clamping means. The annealed bend is stress free and therefore free from long-term stress induced failure mechanism.

As another example, fiber optic cables leading to desktop equipment can be routed over the edge of the desk using a protective assembly comprised of a supporting structure to contain a miniature bend and suitable outer packaging to allow easy and esthetically pleasing integration into the office environment. The bend supporting structure might be made flexible to accommodate a broader range of potential needs.

Figure 6:
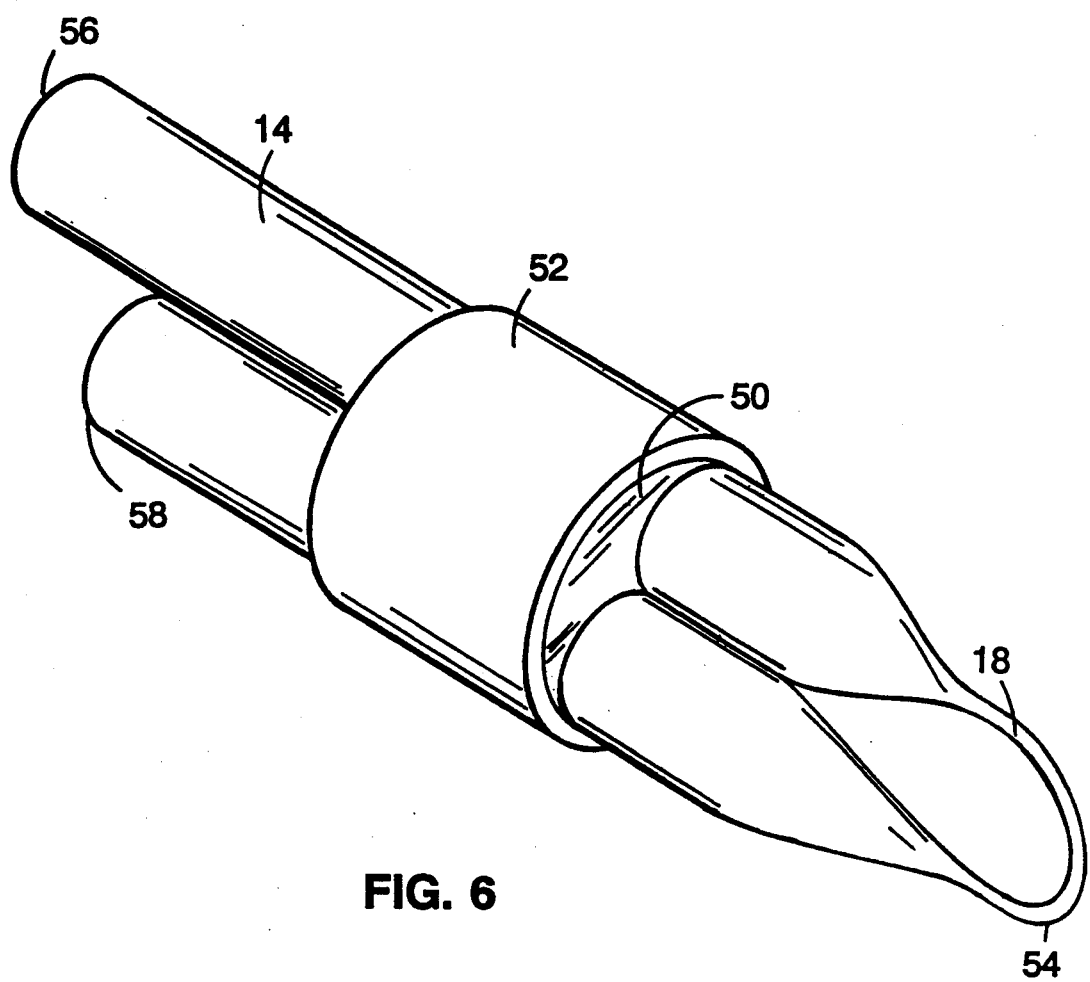
FIG. 6 is a three-dimensional view of a reduced fiber fixed in a 180 angular degree bend.

Shown in FIG. 6 is a fixed 180 degree bend embodiment. Here a fiber 14 is held by e.g., adhesive 50 in a sleeve 52. This embodiment might be placed anywhere within a continuous length of fiber although here the fiber ends 56 and 58 are shown truncated for graphic convenience. The radius of curvature of the 180 degree bend 54 is essentially determined by the radius of the original fiber. The structure provides a miniature means to loop a fiber back in the direction from which it came without requiring mirrors and alignment means. This can prove very useful in integrated optic applications where 180 degrees bend within, e.g. a Lithium Niobate waveguide, cannot be made so small.

Figure 7:
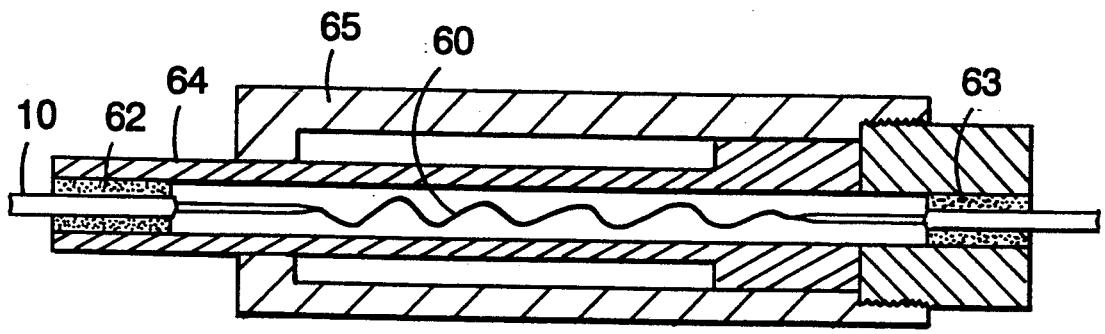
FIG. 7 is a sectional side view of a free standing helical coil of reduced fiber in a linear slip joint application.

The invention, embodied as a helical coil of reduced fiber incorporated into mechanical means to form a linear slip joint is illustrated in FIG. 7. A jacketed optical fiber 10, processed as previously described, is reduced in cross-sectional area and wound into a helical coil 60. The free standing fiber coil 60 can be stress relieved by annealing methods known to those skilled in the art if desired. The coil 60, of diameter of a few millimeters, it subsequently mounted with each end fixed by adhesive 62 and 63 in separate mechanical means 64, and 65 which are free t slide, one upon the other. Means 64 and 65 are assembled so that the distance one might slide relative to the other is limited. When means 64 slides upon mean 65, the coil of fiber 60 is either extended or compressed in a spring-like fashion. In FIG. 7 the coil is shown fully compressed. By virtue of the reduced cross-sectional area, a short length of coiled fiber of the order of 5 cm can be made to withstand linear displacements of more than 3 cm.

Figure 8:
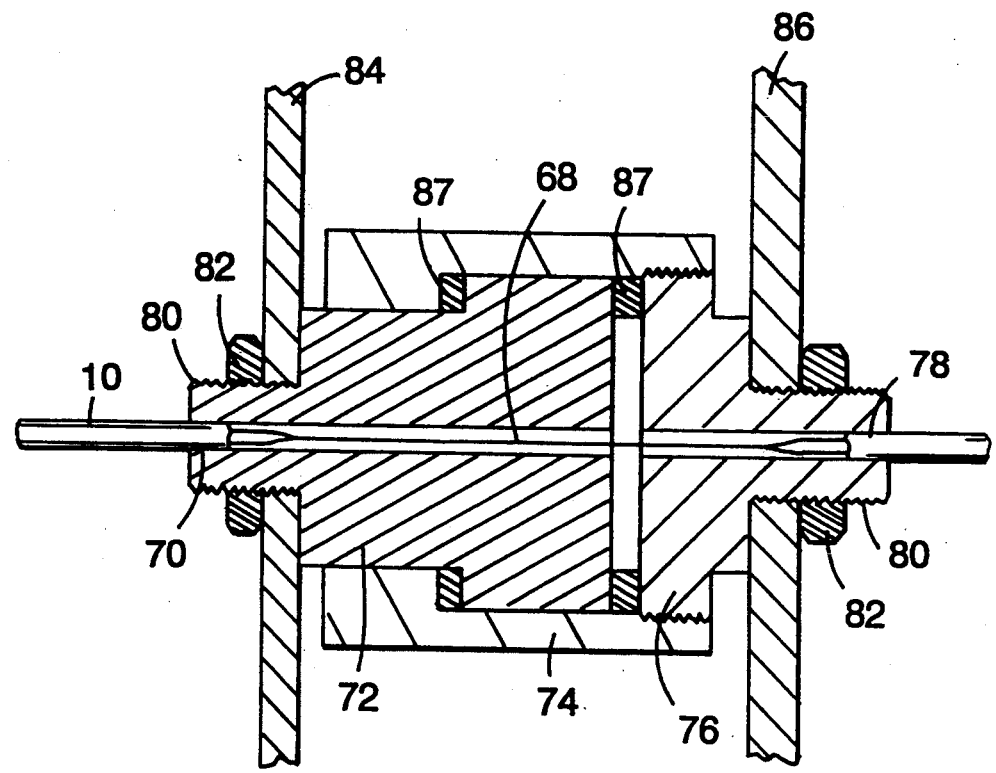
FIG. 8 is a sectional side view of a length of reduced fiber mounted in a mechanical means suitable to serve as a rotational joint.

FIG. 8 illustrates the basic elements of a typical fiber optic rotational connection embodiment of the invention. An optical fiber 10 is reduced in cross-sectional area forming a length of about 1 inch of reduced fiber 68. One end 70 of the fiber is fixed in one separate part 72 of the rotational connection using e.g. adhesive. The other separate part of the connection 74 is mated e.g., by threading the end piece 76 into the body 74 to form the mechanical structure of the connection as depicted here. The other end 78 of the fiber is fixed to the end piece 76 of the connection using e.g., adhesive. The separate parts of the connection are free to rotate about the common longitudinal axis and the reduced fiber 68 lies more or less on that axis. The ends of the connection might be threaded as shown 80 and fixed to separate mechanical structures 84, 86 using nuts 82. A pair of bushings or thrust bearings 87 can be used to reduce slack between the mated rotating mechanical surfaces.

When the separate parts 72 and 74 of the connection are rotated, torsion is applied to the fiber. Such a connection using about 1 inch of fiber reduced to 1 micron diameter can be rotated through more than 360 angular degrees without breakage or loss of optical power, but clearly there is a limit to the number of turns of rotation possible.

Figure 9A:
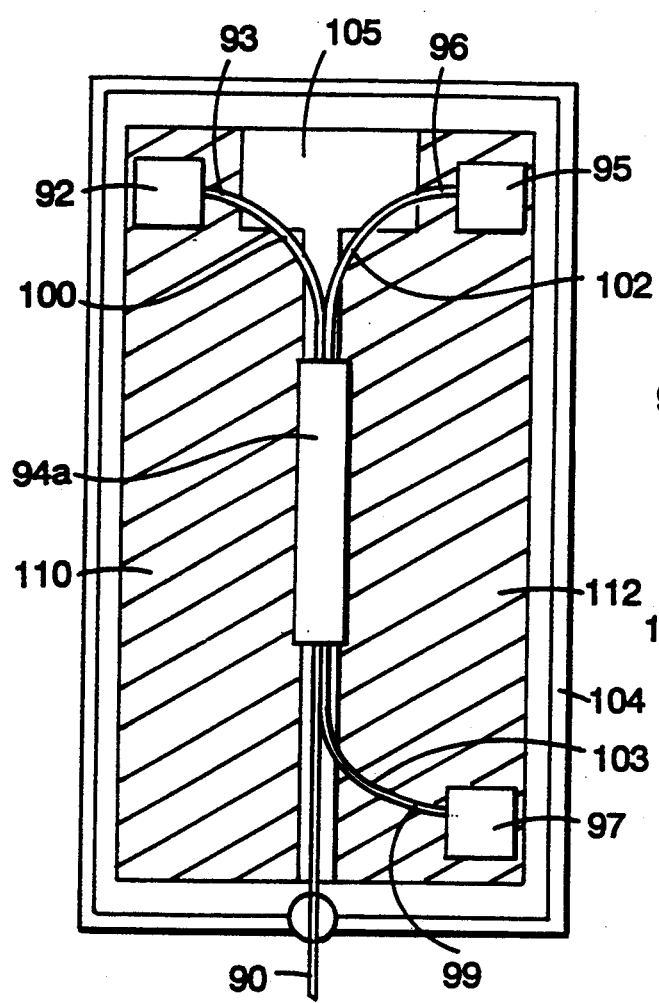
FIG. 9 is a top view of: a) a fiberoptic transceiver using a conventional coupler and full sized fibers, and; b) a transceiver featuring a coupler using the invention to avoid large radius fiber bends inside the transceiver package.
Figure 9B:
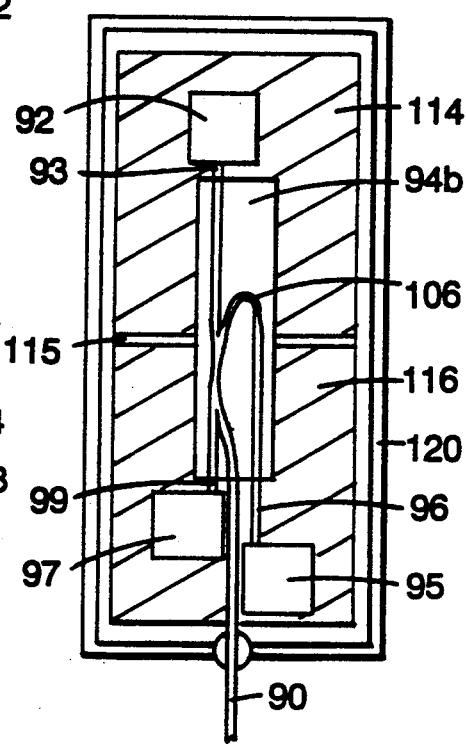

Another embodiment of the invention relates to the miniaturization of electro-optic units. As illustrated schematically in FIG. 9a, a typical fiber optic transceiver uses a bidirectional single fiber link in and out 90. A source of optical power 92 may be connected to one leg 93 of a fiber optic coupler generally indicated by the numeral 94a. A photodetector 95 is Connected to another leg 96 of the coupler 94a on the same side of the coupler as the optical source 92. Light transmitted by the source 92 travels into the coupler 94a, through the optical coupling region and out of the link fiber 90.

The same circuit function is achieved in much less space by using a fiber optic coupler 94b fashioned to include a miniature bend 106 within the coupler package.

What is claimed is:

1. A routing device for changing the direction of a fiberoptic path from a first axis to a second axis, said routing device comprising a length of low-loss optical fiber having first and second directed fiber portions aligned respectively with said first and second axes and a mid-fiber portion integral with said first and second directed fiber portions and extending through an arc of radius of the order of two centimeters or less between said first and second directed fiber portions, said mid-fiber portion in the region of said arc having been treated to have a substantially reduced diameter relative to the diameter of said directed fiber portions in a manner enabling reduction of likelihood of mechanical failure of said routing device over time without introducing substantial optical loss; and an outer member coupled to said optical fiber for fixing said first and second directed fiber portions along said first and second axes, respectively.

2. The routing device of claim 1 wherein the radius of said arc is less than 1 centimeter.

3. The routing device of claim 1 wherein the mid-portion of said fiber is disposed in a passage of said outer member larger in cross section than the cross section of said mid-portion.

4. The routing device of claim 1 wherein in said mid-portion there has been such a reduction in diameter that the lower index of refraction of the external environment of said fiber at said bend enables transmission of light energy through said bend with substantially less bend-loss than would occur if the main length of said fiber were bent as in said mid-portion.

5. The routing device of claim 1, wherein said fiber in the region of its bend has been treated to be in a stress-relieved annealed state.

6. The routing device of claim 5 wherein said mid-fiber portion in the region of said arc has a predetermined radius of curvature, said mid-fiber portion in the region of said arc having been heated to a suitable annealing temperature to relax mechanical bending stress in the region of said arc without increasing the optical power loss attendant to the predetermined bend and wherein said bend occurs over an angular range substantially greater than zero angular degrees and may exceed multiples of 360 angular degrees.

7. The routing device of claim 1 wherein the diameter of said mid-fiber portion in the region of said arc is sufficiently reduced to substantially achieve an air-cladded state in said mid-fiber portion.

8. The routing device of claim 1, 2, 3, 4, 5, 6, or 7 formed as an integral portion of a patch cord or the like, said optical fiber extending integrally outwardly from said first directed portion in a flexible jacket, said second directed portion terminating in a light-transferring end face suitable for connection to another optical fiber in light-transferring relationship.

9. The routing device of claim 1, 2, 3, 4, 5, 6 or 7 in the form of an angled adaptor, said first and second directed portions terminating in light-transferring end faces, said device including connector means for securing respective additional optical fibers in light-transferring relationship with said end faces, whereby, for instance, a patch cord can be made up by connection of one end of said adaptor to the end of a fiber cable.

10. The routing device of claim 1, 2, 3, 4, 5, 6 or 7 formed in the middle of a flexible optical cable, said optical fiber extending integrally outwardly from each of said directed portions in a flexible jacket.

11. The routing device of 1, 2, 3, 4, 5, 6 or 7 comprised of a fiberoptic ribbon comprised of a plurality of optical fibers, each of said fibers having directed portions and an integral mid-portion in the relationship to each other and to said outer member as defined in claim 1.

12. The routing device of claim 1, 2, 3, 4, 5, 6, or 7 wherein said first and second axes are disposed with respect to each other in a right angle.

13. A joint assembly comprising the fiber optic routing device of claim 1, 2, 3, 4, 5 or 7 in the form of a rotary joint wherein said directed portions of said fiber are secured in members of a rotatable joint, said members being rotatable with respect to each other about an axis defined by said fiber in said mid-portion, said rotation twisting said fiber.

14. A joint assembly comprising the fiber optic routing device of claim 1, 2, 3, 4, or 7 wherein said first and second directed-fiber portions are secured in respective members of a joint which are movable with respect to each other to a limited extent with corresponding bending of said mid-fiber portion in the region of said arc.

15. The routing device of claim 1, 2, 3, 4, 7 wherein the optical fiber is single-mode.

16. The routing device of claim 1, 2, 3, 4, or 7 wherein the optical fiber is multi-mode.

17. The routing device of claim 1, 2, 3, 4, or 7 wherein the optical fiber is polarization holding fiber.

18. A joint assembly comprising the fiber optic routing device of claim 1, 2, 3, 4, 5, or 7 in the form of a slip joint wherein said fiber in said mid-portion is bent into the form of a helical coil such that when said first and second directed fiber portions move toward each other said helical coil is compressed and when said first and second directed fiber portions move away from each other said helical coil is expanded.

19. A fiber optic coupler device comprising a plurality of coupled optical fibers, an extension of one or more of said coupled fibers forming the fiber optic path of claim 1.

20. A package incorporating first and second electro-optic devices, at least one routing device according to claim 1, one or more fiber optic devices, and one or more integrated optic components, said first and second electro-optic devices, said fiber optic device and said integrated optic component being interconnected by means of at least one routing device said electro-optic and fiber optic devices being mounted on a rigid support and connected by said routing device, wherein said fiber optic devices are fused fiber optic couplers, said first electro-optic device is selected from a group consisting of light emitters, and said second electro-optic device is selected from a group consisting of light detectors, and said integrated optic component is selected from the group consisting of optical multiplexers, optical modulators, optical phase shifters, and optical polarization controllers.

21. A connection assembly comprising a patch board connection panel presenting a multiplicity of optical path end faces for connection to optical fibers, and a corresponding series of patch cords each incorporating a routing device according to claim 1 having a corresponding end face, the routing devices of said patch cords being connected to said patch board with said end faces thereof in light-transferring relationship with the optic paths of said board, the direction change provided by said routing devices enabling said patch cords to extend in desired lateral, convenient relationships to said patch board.

22. A joint assembly comprising a routing device for changing the direction of a fiberoptic path from a first axis to a second axis, said routing device comprising a short length of low-loss optical fiber having first and second directed fiber portions aligned respectively with said first and second axes and a mid-fiber portion integral with and extending through an arc of radius of the order of two centimeters or less between said first and second directed fiber portions, said mid-portion of fiber being in a treated state that reduces likelihood of mechanical failure of said routing device over time without introducing substantial optical loss, and an outer member coupled to said optical fiber for fixing said first and second directed fiber portions along said first and second axes, respectively, said outer member serving to protect said first and second directed fiber portions and said mid-portion from the environment, wherein said first and second directed-fiber portions are secured in respective members of a joint which are movable with respect to each other to a limited extent with corresponding bending of said mid-fiber portion in the region of said arc.

23. A joint assembly comprising a routing device for changing the direction of a fiberoptic path from a first axis to a second axis, said routing device being configured in the form of a slip joint, said routing device comprising a short length of low-loss optical fiber having first and second directed fiber portions aligned respectively with said first and second axes and a mid-fiber portion integral with and extending through an arc of radius of the order of two centimeters or less between said first and second directed fiber portions, said mid-portion of fiber being in a treated state that reduces likelihood of mechanical failure of said routing device over time without introducing substantial optical loss, and an outer member coupled to said optical fiber for fixing said first and second directed fiber portions along said first and second axes, respectively, said outer member serving to protect said first and second directed fiber portions and said mid-portion from the environment, wherein said fiber in said mid-portion is bent into the form of a helical coil such that when said first and second directed fiber portions move toward each other said helical coil is compressed and when said first and second directed fiber portions move away from each other said helical coil is expanded.

24. A joint assembly comprising a routing device for changing the direction of a fiberoptic path from a first axis to a second axis, said routing device being configured in the form of a rotary joint, said routing device comprising a short length of low-loss optical fiber having first and second directed fiber portions aligned respectively with said first and second axes and a mid-fiber portion integral with and extending through an arc of radius of the order of two centimeters or less between said first and second directed fiber portions, said mid-portion of fiber being in a treated state that reduces likelihood of mechanical failure of said routing device over time without introducing substantial optical loss, and an outer member coupled to said optical fiber for fixing said first and second directed fiber portions along said first and second axes, respectively, said outer member serving to protect said first and second directed fiber portions and said mid-portion from the environment, wherein said directed portions of said fiber are secured in members of a rotatable joint, said members being rotatable with respect to each other about an axis defined by said fiber in said mid-portion, said rotation twisting said fiber.

25. A method of making a routing device for changing the direction of a fiberoptic path from a first axis to a second axis, said method comprising the steps of:

providing a length of low-loss optical fiber having first and second directed fiber portions;

reducing the diameter of a mid-portion of said fiber a substantial amount relative to the diameter of said directed fiber portions;

bending said fiber in said mid-portion through an arc of radius of the order of 2 cm or less so that said first and second directed fiber portions are aligned with the first and second axes, respectively, said steps of bending and reducing being performed in manner reducing likelihood of mechanical failure over time without introducing substantial optical loss.

26. The method of claim 25 wherein the step of reducing comprises reducing the diameter of said mid-fiber portion until an air-cladded state is substantially achieved in said mid-fiber portion.

27. The method of claim 25 wherein said step of reducing comprises a step selected from the group consisting of etching, polishing, or drawing.

28. The method of claim 25 wherein said step of reducing comprises differential-speed unidirectional drawing.

* * * * *